(12) United States Patent
Ethier et al.

(10) Patent No.: US 7,653,876 B2
(45) Date of Patent: Jan. 26, 2010

(54) REVERSIBLE DOCUMENT FORMAT

(75) Inventors: Christopher Ethier, Ottawa (CA); John P. Brinkman, Ottawa (CA); Gavin McKenzie, Ottawa (CA); Carl W. Orthlieb, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 778 days.

(21) Appl. No.: 10/409,622

(22) Filed: Apr. 7, 2003

(65) Prior Publication Data

US 2004/0199876 A1     Oct. 7, 2004

(51) Int. Cl.
*G06F 17/00* (2006.01)
(52) U.S. Cl. ...................................... 715/249
(58) Field of Classification Search ................. 715/523, 715/249
See application file for complete search history.

(56) References Cited

U.S. PATENT DOCUMENTS

| | | | |
|---|---|---|---|
| 5,486,686 A | 1/1996 | Zdybel et al. | |
| 5,528,742 A | 6/1996 | Moore et al. | |
| 5,706,290 A | 1/1998 | Shaw et al. | |
| 5,778,359 A | 7/1998 | Stent | |
| 6,064,748 A | 5/2000 | Hogan | |
| 6,070,160 A | 5/2000 | Geary | |
| 6,336,124 B1 * | 1/2002 | Alam et al. | 715/523 |
| 6,418,448 B1 | 7/2002 | Sarkar | |
| 6,496,543 B1 | 12/2002 | Zehavi | |
| 6,609,200 B2 * | 8/2003 | Anderson et al. | 713/176 |
| 6,662,186 B1 * | 12/2003 | Esquibel et al. | 707/101 |
| 6,678,699 B2 * | 1/2004 | Stephens et al. | 707/104.1 |
| 6,810,429 B1 | 10/2004 | Walsh et al. | |
| 6,850,228 B1 | 2/2005 | Parks et al. | |

(Continued)

FOREIGN PATENT DOCUMENTS

EP          1022651          7/2000

(Continued)

OTHER PUBLICATIONS

Khramov et al., "Extracting Semantic Knowledge from PDF Publications", *XML Conference 2001*, Obtained from the Internet at www.idealliance.org/papers/lm12001/papers/pdf/04-04-06.pdf, on Jan. 13, 2005, 7 pages.

(Continued)

*Primary Examiner*—Amelia Rutledge
(74) *Attorney, Agent, or Firm*—Fish & Richardson P.C.

(57) ABSTRACT

Systems and techniques to create and use a reversible format document. In general, in one implementation, the technique includes: obtaining an electronic document in a binary format, reforming the electronic document in a markup language format using information selected from the binary format document according to predefined extraction parameters, and inserting an encoded version of the electronic document in the binary format into the electronic document in the markup language format. A markup language document can include a first and second portions, the first portion including a subset of information, including rules governing how the electronic document is processed by a machine, from a binary format document corresponding to the second portion, and the second portion including an encoded version of the binary format document, where the electronic document is fully transformable to the binary format after a modification to the electronic document in the markup language format.

63 Claims, 4 Drawing Sheets

U.S. PATENT DOCUMENTS

| | | | |
|---|---|---|---|
| 6,941,510 | B1 | 9/2005 | Ozzie et al. |
| 6,959,415 | B1 | 10/2005 | Soderberg et al. |
| 6,963,972 | B1 | 11/2005 | Chang et al. |
| 6,996,770 | B1 | 2/2006 | Deen et al. |
| 7,035,837 | B2 * | 4/2006 | Reulein et al. ................. 707/1 |
| 7,353,287 | B2 | 4/2008 | Parent et al. |
| 2001/0037415 | A1 | 11/2001 | Freishtat et al. |
| 2002/0069157 | A1 | 6/2002 | Jordan |
| 2002/0120652 | A1 * | 8/2002 | Rising et al. ................. 707/513 |
| 2003/0097462 | A1 | 5/2003 | Parent et al. |
| 2003/0131312 | A1 * | 7/2003 | Dang .......................... 715/500 |
| 2004/0015832 | A1 | 1/2004 | Stapp et al. |
| 2004/0103367 | A1 * | 5/2004 | Riss et al. .................... 715/506 |
| 2004/0205452 | A1 * | 10/2004 | Fitzsimons et al. ........... 715/500 |
| 2004/0205533 | A1 * | 10/2004 | Lopata et al. ................ 715/507 |
| 2004/0210535 | A1 | 10/2004 | Erickson |

FOREIGN PATENT DOCUMENTS

| | | |
|---|---|---|
| WO | WO 01/06348 | 1/2001 |

OTHER PUBLICATIONS

"PDFORM User's Manual Version 2.33", document dated Feb. 28, 2003, Obtained from the Internet at pdf-tools.com on Jan. 13, 2005, 3 pages.

"OmniPage Pro 12 Office", Obtained from the Internet at http://web.archive.org/web/20030207095853/http://www.scansoft.com/onmipage/> on Jan. 13, 2005, 2 pages.

www.w3.org/MarkUp/Forms/ website: "Xforms-The Next Generation of Web Forms," Mar. 24, 2003, 8 pages.

www.w3.org/Submission/1999/05/ website: "Submission request to W3C (W3C Team Comment)", May 14, 1999, 3 pages.

www.w3.org/1999/05/XFA/xfa-template website: "XFA-Template Version 1.0" May 14, 1999, 196 pages.

www.w3.org/DSig/ website: "Digital Signature Initiative", Jun. 19, 1999, 6 pages.

www.w3.org/1999/07/xml-pkg234/Overview website: "Report on XML Packaging," Aug. 2, 1999, 19 pages.

www.adobe.com/products/xmp/main.html website: "Extensible Metadata Platform (XMP)", Mar. 25, 2003, 2 pages.

Adobe Systems Incorporated, "Embedding XMP Metadata in Application Files (DRAFT)," Sep. 14, 2001, 16 pages.

Adobe Systems Incorporated, "XMP-Extensible Metadata Platform," Version 1.5, Sep. 14, 2001, 88 pages.

www.w3.org/Signature/ website: XML Signature WG, Mar. 25, 2003, 5 pages.

Backlund, Bjorn; OOE: A Compound Document Framework; SIGCHI Bulletin; vol. 29 No. 1; Jan. 1997; http://www.acm.org/sigchi/bulletin/1997.1/backlund.html p. 1-17.

Borenstein, et. al. "MIME (Multipurpose Internet Mail Extensions) Part One: Mechanisms for Specifying and Describing the Format of Internet Message Bodies", The Internet Engineering Task Force Network Working Group, Request for Comments: 1521, Sep., 1993, Downloaded from the Internet at http://www.tools.ietforg/html/rfc1521, on Jul. 10, 2007, 81 pages.

Freed, et al. "MIME Parameter Value and Encoded Word Extensions: Character Sets, Languages, and Continuations", The Internet Engineering Task Force Network Working Group, Request for Comments: 2231, Nov. 1997, Downloaded from the Internet at http://www.tools.ietf org/html/rfe2231, on Jul. 10, 2007, 10 pages.

Freed, et al. "Multipurpose Internet Mail Extensions (MIME) Part One: Format of Internet Message Bodies", The Internet Engineering Task Force Network Working Group, Request for Comments: 2045, Nov. 1996, Downloaded from the Internet at http://www.tools.iettorg/html1/rfc2045, on Jul. 10, 2007, 31 pages.

Freed, et al. "Multipurpose Internet Mail Extensions (MIME) Part Five: Conformance Criteria and Examples", The Internet Engineering Task Force Network Working Group, Request for Comments: 2049, Nov. 1996, Downloaded from the Internet at httn://www.tools.ietf org/html/rfc2049, on Jul. 10, 2007, 24 pages.

Freed, et al. "Multipurpose Internet Mail Extensions (MIME) Part Two: Media Types", The Internet Engineering Task Force Network Working Group, Request for Comments: 2046, Nov. 1996, Downloaded from the Internet at http://www.tools.ietf.orglhtml/rfc2046, on Jul. 10, 2007, 44 pages.

Grand, "MIME Overview", Oct. 26, 1993, downloaded from the internet at http://mgrand.home.mindsoring.corn/rnime.html on Jul. 10; 2007, 13 pages.

Levinson, "The MIME Multipart/Related Content-Type", The Internet Engineering Task Force Network Working Group, Request for Comments: 2387, Aug. 1998, Downloaded from the Internet at http://www.tools.ietf.org/htrnllrfc2387, on Jul. 10, 2007, 10 pages.

Moore, "MIME (Multipurpose Internet Mail Extensions) Part Three: Message Header Extensions for Non ASCII Text", The Internet Engineering Task Force Network Working Group, Request for Comments: 2047, Nov. 1996, Downloaded from the Internet at http:!/www.tools.ietf.org/html!rfc2047, on Jul. 10, 2007, 15 pages.

Tichy, "RCS-A System for Version Control", Jan. 3, 1991, downloaded from the internet at www.es.purdue.edu/homes/trinkle/RCS/rcs.ps. on Jul. 10, 2007, 20 pages.

Adobe Systems Incorporated, "A Manager's Introduction to Adobe eXtensible Metadata Platform, The Adobe XML Metadata Framework", Nov. 12, 2008, 18 pages.

* cited by examiner

REVERSIBLE DOCUMENT FORMAT

BACKGROUND OF THE INVENTION

The present application describes systems and techniques relating to document formats and format conversion.

Organizations are increasingly using machine-based networking technology to manage their relationships with clients and affiliates. These technologies are used by private enterprise and public institutions to effect many types of transactions that involve information collection and communication, typically using electronic documents. For example, an electronic form is an electronic document used to capture, present, transport, process and output information associated with a transaction. An electronic form is different than a paper form in that it includes not only aspects of visual presentation and information collection, but also processing rules to be used by a machine that handles the form.

Many electronic documents are in binary formats, which provide a great deal of flexibility in how information is represented in the document, but typically result in limited flexibility in how the information is accessed, including by human readers. Processing information from a document in a binary format typically requires the use of an Application Program Interface (API) to access the information, either to extract information of interest or to convert the binary format into another format. Format conversion typically lacks versatility and can result in a loss of information. Conversion filters are frequently lossy, even when they are reciprocal, because they frequently rely on a lowest common denominator document object model. Extracting information from a binary format document using an API adds another layer of programming complexity, and this added layer of complexity can be of particular concern when the binary format is a proprietary format that is defined and controlled by a particular vendor. In response to the difficulties created by binary formats, markup languages have been developed to allow document-based information to be shared and re-used across software applications and computer platforms in an open, vendor-neutral manner, and to make the electronic document more readily human readable.

Markup languages generally use text-based encoding schemes to represent information (e.g., ASCII or Unicode), markup rules to specify document structure, and metalanguage rules to specify document semantics. A commonly used markup language is Hypertext Markup Language (HTML). HTML forms are frequently used to enable initiation of network-based transactions; a user may fill out an HTML form available over the Internet using any Web browser. HTML is a standardized, non-proprietary markup language format that uses defined tags to specify document semantics. However, HTML does not generally separate tags relating to data type semantics from tags relating to data presentation semantics. Thus traditional HTML forms mix data collection information with data presentation information in the same document.

In contrast, XForms is a forms specification being developed by the World Wide Web Consortium (W3C) that uses Extensible Markup Language (XML) to separate form data into sections that describe what the form does (data type semantics stored in XML), and sections that describe how the form should look (data presentation semantics stored in XHTML (Extensible HTML)). When data in the form needs to change, a Web server may send new data to the Web browser in the XML format. When presentation of the form needs to change, the Web server may send a new XHTML document.

Additionally, the XML Forms Architecture (XFA) is a forms specification submitted to the W3C by JetForm Corporation. XFA builds on XForms by adding features that address the needs of organizations that use electronic forms, and the applications that process them. XFA includes an XFA-Template specification and an XFA-FormCalc specification. The XFA-Template specification describes open and extensible modeling of secure forms, including automated calculation and validation, pluggable user-interface components, and flexible data handling. The XFA-FormCalc specification describes a scripting language used in creating logic and calculations tailored to electronic-forms.

In general, an HTML document may be thought of as a single virtual page, regardless of whether the document is formatted as traditional HTML or XHTML. An HTML document generally has no ability to specify which portions of the document will appear on which physical pages when printed. In fact, a publisher of an HTML document has no final control over how the document will appear to an end user, because presentation of an HTML document, either by display on a monitor or by printing, is determined by the application that interprets the HTML tags.

In contrast, a final format document is an electronic document describing one or more virtual pages having a predetermined final format. The predetermined final format defines a specific visual appearance for the electronic document when displayed or printed. A final format document generally provides a device-independent and resolution-independent format for publishing and/or distributing electronic documents. Thus, a final format document defines an appearance of the document and can readily be stored as a file that lies between a layout program and the typical raster image processors, which drive traditional printing apparatus.

The final format generally allows a publisher to control the look and feel of the document as seen by an end user, including the specific physical page or pages on which information appears when printed or displayed. Thus, the final format should generally support and preserve all visual formatting features (e.g., fonts, graphics, color, etc.) of any source document, regardless of the source computer platform and/or software application used to create the source document. The ability to control final appearance, or look-and-feel, of an electronic document as viewed by a reader can be a critical branding issue for businesses and other publishing organizations, and is particularly useful when available across various computer platforms.

An example of a final format is the PORTABLE DOCUMENT FORMAT™ (PDF™) developed by Adobe Systems Incorporated of San Jose, Calif. PDF is an example of a binary format. Example software for creating and reading PDF documents is the ADOBE ACROBATS® software, also of Adobe Systems Incorporated. The ACROBATS® software is based on Adobe's POSTSCRIPT® technology which describes formatted pages of a document in a device-independent fashion.

Final format documents may be used in client-server environments. For example, on the World Wide Web, PDF documents are commonly used to present various types of information to, and also to obtain information from, Web users. Adobe Systems Incorporated provides a PDF reader tool, including a plug-in to Web browsers, for free. This allows anyone to read the binary format after installing the PDF reader tool and encourages use of the PDF final format. A final format document may represent a form, which users can fill in and/or print out, or which a server can modify to include data specific to a user. For example, Forms Data Format (FDF) is a data representation format developed by Adobe Systems Incorporated to allow importing of data into an existing PDF document. FDF files may be used to submit data to a server, or to receive data from a server. FDF Toolkit is an API developed by Adobe Systems Incorporated to facilitate the writing of server applications to generate and/or parse FDF data from a form created by the Adobe ACROBAT™ Forms plug-in.

SUMMARY OF THE INVENTION

In general, the invention features systems and techniques relating to creating and using a reversible format document. According to an aspect, an electronic document in a binary format can be obtained, the electronic document can be reformed in a markup language format using information selected from the electronic document in the binary format according to predefined extraction parameters, and an encoded version of the electronic document in the binary format can be inserted into the electronic document in the markup language format. The electronic document in the binary format can be a received document, or generated from received information, and the electronic document in the binary format can be transformed into the markup language format by extracting a subset of information from the electronic document in the binary format according to predefined extraction parameters, incorporating the subset of information into new portions of the electronic document in the markup language format, and inserting an encoded version of the electronic document in the binary format into the electronic document in the markup language format.

According to another aspect, an electronic document can be provided in a markup language format, where the document includes a first portion and a second portion, the first portion including a subset of information from a binary format document corresponding to the second portion, the subset of information including rules governing how the electronic document is processed by a machine, and the second portion including an encoded version of the binary format document, where the electronic document is fully transformable to the binary format after a modification to the electronic document in the markup language format. The encoded version of the electronic document in the binary format can contain less information than the document in the binary format. The binary format can be a predetermined final format that defines an appearance of the electronic document, such as PDF. The markup language format can be an extensible markup language format, such as XML. Moreover, in another aspect, a system can include a processor, a machine-readable medium coupled with the processor, a network interface coupled with the processor, and a software product (e.g., a server software product) tangibly stored on the machine-readable medium. The software product can include instructions operable to cause a programmable processor to perform operations as described herein.

Advantageous implementations of the invention include one or more of the following features. A transformed document can be received and transformed into the binary format by unencoding the encoded version of the electronic document in the binary format, and selectively updating the unencoded version of the electronic document in the binary format with information from a markup language portion of the received electronic document. Selectively updating the unencoded version of the electronic document can involve transferring recognized information from the markup language portion of the received electronic document to the retransformed electronic document in the binary format, and placing unrecognized information in a designated location in the retransformed electronic document in the binary format such that the unrecognized information is retrievable upon retransformation to the markup language format. The recognized information has a corresponding definition in the binary format, and the unrecognized information does not have a corresponding definition in the binary format.

Transferring the recognized information can involve overwriting existing information in the unencoded version of the electronic document in the binary format in a case of information conflict, and/or selectively overwriting existing information in the unencoded version of the electronic document in the binary format based on read/write permissions. The predefined extraction parameters can be extraction parameters defined by a creator of the electronic document, and the electronic document can include rules governing information capture. The subset of information can be a template definition, which can include at least a portion of the rules governing information capture.

The electronic document can be preprocessed by modifying a markup language portion of the electronic document. This preprocessing can involve pre-populating the electronic document with data at a third party that receives the electronic document from a server, or this preprocessing can involve server-side personalization of the electronic document. Such a preprocessed electronic document can be received, retransformed into the binary format as described, and sent over a network. Moreover, sending a retransformed and modified electronic document over a network can involve electronically publishing the retransformed and modified electronic document to the network (e.g., a public network).

The electronic document can be digitally signed in the markup language format to produce a digital signature that survives a transformation of the electronic document to the binary format and back to the markup language format. For example, an electronic document that has been digitally signed and then transformed into the binary format can be sent over a network, then received and transformed into the markup language format, and the digital signature remains intact. Digitally signing the electronic document in the markup language format can involve not signing the encoded version of the electronic document in the binary format inside the transformed electronic document in the markup language format. The digital signature can correspond to one or more designated portions of the electronic document that have been signed, where the one or more designated portions include added information that does not have a corresponding definition in the binary format.

Information that has been selected or extracted from the electronic document in the binary format and incorporated into new portions of the electronic document in the markup language format can include annotations, audit trail information, workflow routing information, asset management information, configuration information, and/or data source information. Additionally, the electronic document can be flattened in the binary format before inserting the encoded version of the electronic document in the binary format, and the electronic document in the markup language format can be archived, such as using XML archival tools.

The invention can be implemented to realize one or more of the following advantages. A reversible document with two distinct formatting states can be provided, where the document can be transformed back and forth between a binary format and a markup language format any number of times without loss of desired information. One of the formats can be an extensible markup language format, such as XML, providing the full flexibility of open ended document definition while retaining the benefits of a binary format. The binary format can be a predetermined final format that defines an appearance of the electronic document, such as PDF, providing a document creator with the ability to control the look-and-feel of an electronic document as viewed by a reader. Moreover, the reversible document using a predetermined final format can facilitate transactions by ensuring that a document can serve as evidence of a specific contractual agreement while retaining the machine-based processing benefits of standardized markup languages.

A software tool, including different versions of the tool, can be provided to facilitate transformation and use of the reversible document. The reversible format document can be used to provide a secure transaction document with both vendor-specific document features and vendor-independent processing flexibility, making it easier to deploy, submit and manage a secure transaction using binary electronic documents, such as PDF forms. Exposing transaction related information, such as form template information, configuration information, data source information, workflow routing information, annotations, audit trail information and asset management information, in a markup language format document as described can facilitate transaction handling and significantly improve electronic-document-based transaction processing systems.

Integration of binary format documents with third party systems can be facilitated, and an application program interface (API) need not be used to extract data from the binary format document. This can be accomplished while also providing a secure package for transmission; the information that is exposed in the markup language format can be defined as desired. Personalized documents can be created by merging markup language data (e.g., XML data) into the document when in the markup language format.

Additional information, such as data used to integrate with third party systems, can be added to and preserved in the document, even if not recognized by the binary format. Such information (e.g., an original source file for the document, meta-data, state information) can be added as embedded data objects and extracted at a later time. For example, third party workflow systems can have their own markup schema to route documents. The markup language format can support this routing schema as well as incorporate other workflow systems' schemas to facilitate integration among different workflow systems. This feature can also be applied in asset management systems that use different schemas for metadata. The markup language format can support multiple asset management schemas to provide seamless integration from one asset management system to another.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Figure 1:
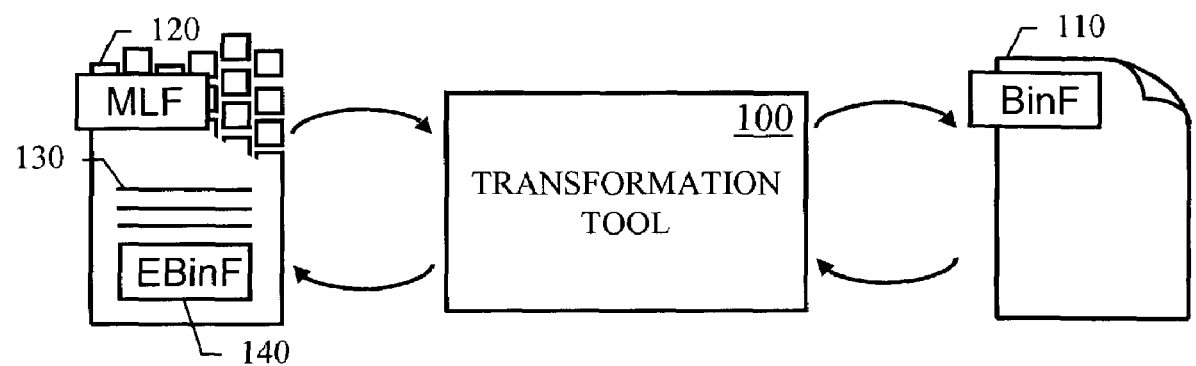
FIG. 1 is a block diagram illustrating reversible document format transformation.

FIG. 1 is a block diagram illustrating reversible document format transformation. A transformation tool 100 can be provided by a vendor and can be a stand alone application or a plug-in to another application. The tool 100 can transform a binary format document 110 into a markup language format document 120 and back any number of times without loss of information. Because the transformation is lossless, the documents 110, 120 can be viewed as a single reversible document with two distinct formatting states. The binary format can be a predetermined final format that defines an appearance of the electronic document, such as PDF. The markup language format can be an extensible markup language format, such as XML.

During the transformation, information can be extracted from the binary format according to predefined extraction parameters and incorporated into the markup language document 120. Because markup languages can use standardized tags and document structure to define document semantics, the transformation tool 100 can create tags and structure 130 used to define the extracted information in the markup language format document 120. These created tags and structure 130 represent new portions of the document 110, 120 in that they need not exist when the document is in its binary format 110.

Also during the transformation, the tool 100 can insert an encoded version 140 of the electronic document in the binary format into the electronic document in the markup language format. This encoded version 140 is encoded to conform with the markup language format, and this encoded version 140 can be the entire document 110 or less than all of the document 110. The encoded version 140 can contain less information than the document 110 because at least some of the extracted information need not be stored twice in the markup language format document 120.

The encoded version 140 provides a repository inside the markup language document 120 for any information that cannot be exposed in the markup language format, and/or that a document creator may not want to have exposed in the markup language format. For example, a document can be transformed to expose only the information needed to index the document, and thus the document creator can specify that only the structured text and document metadata are exposed in the markup language format. The markup language format document 120 can be processed as any other document in that format can be processed, including the use of digital signature technology. The information exposed in the markup language format can be sufficient to allow a full range of processing to occur without accessing the encoded version 140. Thus, the document 120 can be readily used across software applications and computer platforms in an open and secure, vendor-neutral manner.

Moreover, the document 120 can be extensible, such as when the markup language is XML. When the transformation tool 100 transforms the markup language document 120 back into the binary format document 110, the encoded version 140 can be unencoded and selectively updated with information from a markup language portion 130 of the document 120, which may have been modified. There can be various rules used to determine how conflicts between information pulled from the markup language format and information in the unencoded version of the binary format are handled during the selective updating. One such rule can be to assume that the information from the markup language format is the correct information, with some exceptions (e.g., document creation date). New document portions can be created in the binary format to accommodate information pulled from the markup language format as needed, and these new document portions can be in the markup language format or something close to the markup language format when the binary format includes such definitions in the binary format specification. For example, PDF stores some data in XML format and some data in formats that are readily convertible to XML format.

Any unrecognized information pulled from the markup language format (i.e., information that does not have a corresponding definition in the binary format) can be placed inside the binary format in a designated location (e.g., an embedded data object). This placement of any unrecognized information makes the unrecognized information retrievable upon retransformation to the markup language format. Moreover, the placement of unrecognized information and/or new binary document portions in the markup language format can be done in a manner that facilitates access in the binary format. For additional details, see U.S. Patent Application entitled "MARKED FOREIGN DATA BLOCKS", filed Sep. 26, 2001, and having application Ser. No. 09/965,117, which published as U.S. Patent Publication No. US 2003/0097462 on May 22, 2003, and issued as U.S. Pat. No. 7,353,287 on Apr. 1, 2008.

Figure 2:
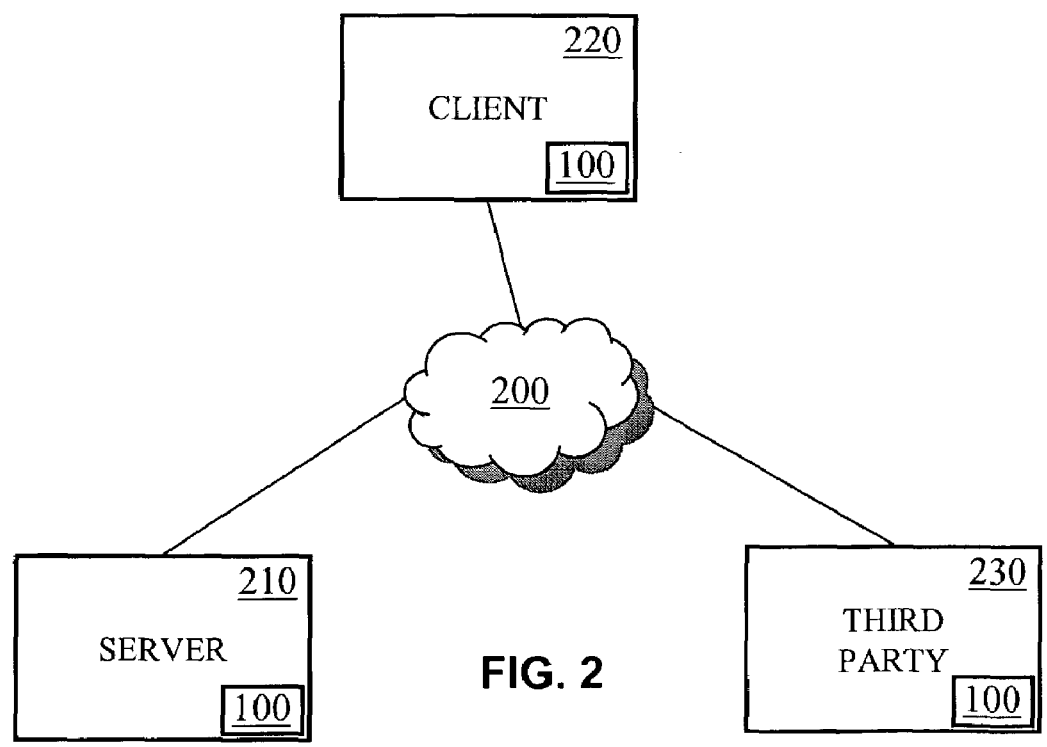
FIG. 2 is a block diagram illustrating an example client-server environment.

FIG. 2 is a block diagram illustrating an example client-server environment. A network 200 provides communication links between a server 210 and a client 220, and potentially a third party 230. The network 200 can be any communication network linking machines capable of communicating using one or more networking protocols, including a local area network (LAN), metropolitan area network (MAN), wide area network (WAN), enterprise network, virtual private network (VPN), the Internet, etc. The server 210 can be any machine or process, capable of communicating over the network 200, that has resources available to other machines coupled with the network 200. Likewise, the third party 230 can be any machine or process, capable of communicating over the network 200, that has a resource available to other machines coupled with the network 200. The client 220 can be any machine or process capable of communicating over the network 200 with the server 210 and the third party 230. For example, the server 210 can be a Web server, the client 220 can be a Web browser, and the third party 230 can be a process provided by an affiliate of the provider of the server 210. The client 220 requests resources from the server 210, and the server 210 provides requested resources to the client 220, possibly using the third party 230 to obtain information during communication with the client 220 and/or as an intermediary between the server 210 and the client 220.

Any or all of the server 210, the client 220 and the third party 230 can include the tool 100. Various combinations make various use scenarios possible, but in general, employing the tool 100 provides flexibility in how an electronic document is presented and processed, allowing the benefits of a binary format to be combined with the benefits of a standardized markup language format. To further enhance utility, different versions of the tool 100 can be provided. For example, a free version of the tool 100 can be provided to users to install on client machines, such as personal computers and portable processing devices, to encourage adoption of the combined binary and markup language format, while other versions of the tool 100 can be sold to resource providers, such as in a component of a server.

The tool 100 can be standalone software or embedded in a client or server product. For example, a server product can be provided with the capability to create the markup language format from a template or intelligently route the format in an ad hoc or defined business process. The server product can include the capability to merge data extracted from core applications, databases, or other documents that capture data, such as HTML or PDF forms, into the markup language format.

A web application using HTML forms to capture data can send the data stream to the server to be merged into a legal personalized contract to be internally routed and integrated into a financial back-end application. Moreover, to provide personalized forms management, the server can be designed to merge personal metadata like name, address, and contact information into the markup language format to pre-fill a form. This provides a personalized experience for the end user. This capability can also be included in the binary format libraries, such as PDF libraries, where they can be embedded into third party applications like document management systems. Various example scenarios are now discussed in the context of electronic forms, PDF and XML, without any limitation on the general applicability of the scenarios and the techniques described.

The server 210, or the third party 230, can merge data into a PDF form, without using an API, before sending the PDF form to the client 220. For example, the server 210 can send a PDF form to the third party 230, the third party can then transform the PDF form into an XML form using the tool 100 and pre-populate the XML form using an XML processor. The third party 230 can then transform the pre-populated XML form back into a PDF form and send the pre-populated PDF form to the client 220. Thus, the XML document can be used to integrate with third party applications that are based on XML, or the XML document can be used to perform server side personalization.

The client 220 can submit a PDF form, with data included, to the server 210. The server 210 can then transform the submitted PDF into XML using the tool 100 and use the XML document for further processing. Alternatively, the client 220 can use a PDF document and then transform the document to XML before submission to the server. The server 210 can also archive the XML document in an XML repository. Thus, an organization can archive a single document in an XML repository where the XML document includes the encoded PDF for later use. Different XML versions of the document can be used for processing and archiving. For example, an archived XML form can include an encoded version of the PDF document that has been flattened to reflect an initial or final state of a transaction.

Document publishing can be done using the PDF document, which can take advantage of the streaming capabilities of PDF. Data can be secured during transit, and document size minimized using the PDF document. When XML digital signatures are desired, the XML document can be used. Thus, a reversible format document can be used to provide a secure transaction document with both vendor-specific document features and vendor-independent processing flexibility.

The reversible document format makes it easier to deploy, submit and manage a secure transaction using binary electronic documents, such as PDF forms. A PDF document can be transformed into an XML document, where information is exposed in the accessible XML format, which can be easily integrated with existing XML tools. Data is consumable and editable by any third party XML DOM (Document Object Model) for simplified integration to core application, content management system, and custom application development. No APIs or additional products are required to extract or merge data to and from the PDF. The XML document can contain the information represented in the transaction, and the embedded PDF can represent a full state of the transaction. Thus, organizations do not need an API to extract or merge data and search and store a PDF form, thereby simplifying the integration of PDF forms with existing infrastructure.

The PDF form can be created using a form designer that generates an XML template with its definition. The form designer can create the PDF form with an embedded XML template or create the XML form with the encoded PDF inside. The form can then be deployed to a Web server or application. The end user can access the PDF form or the XML form, and form information can be added to the XML form by simply filling in the XML data elements. These new data elements are automatically merged when the end user opens the form.

The end user can be provided with the option of submitting either a PDF document or an XML document. XML digital signature algorithms can be used. Moreover, the user can interchangeably read and write in the XML document format or the PDF document format without losing any data.

This combined format can also provide the capability to track changes in an electronic document, including tracking of document annotations, to provide a complete audit trail of changes to document information. This can be very useful in a multi step document generation process involving multiple contributors. Such change tracking can further improve the legal integrity of the electronic document by individually separating and tracking changes. Digital signatures can further enhance this capability by digitally signing the changes to the document individually.

Moreover, electronic documents generated, from either a client or a server, for the purpose of review and comment can be routed using email or a workflow system to users in parallel or in sequence. Users can add annotations to the document and submit the document in the markup language format to an application. In the markup language format, annotations can be separately stored and delineated. As a result, server or client applications can be configured to search, add, delete, or consolidate annotations on a per instance basis by document in an automated or user-guided process. In addition, such annotations can be portable to other documents or survive when assembling documents.

Figure 3:
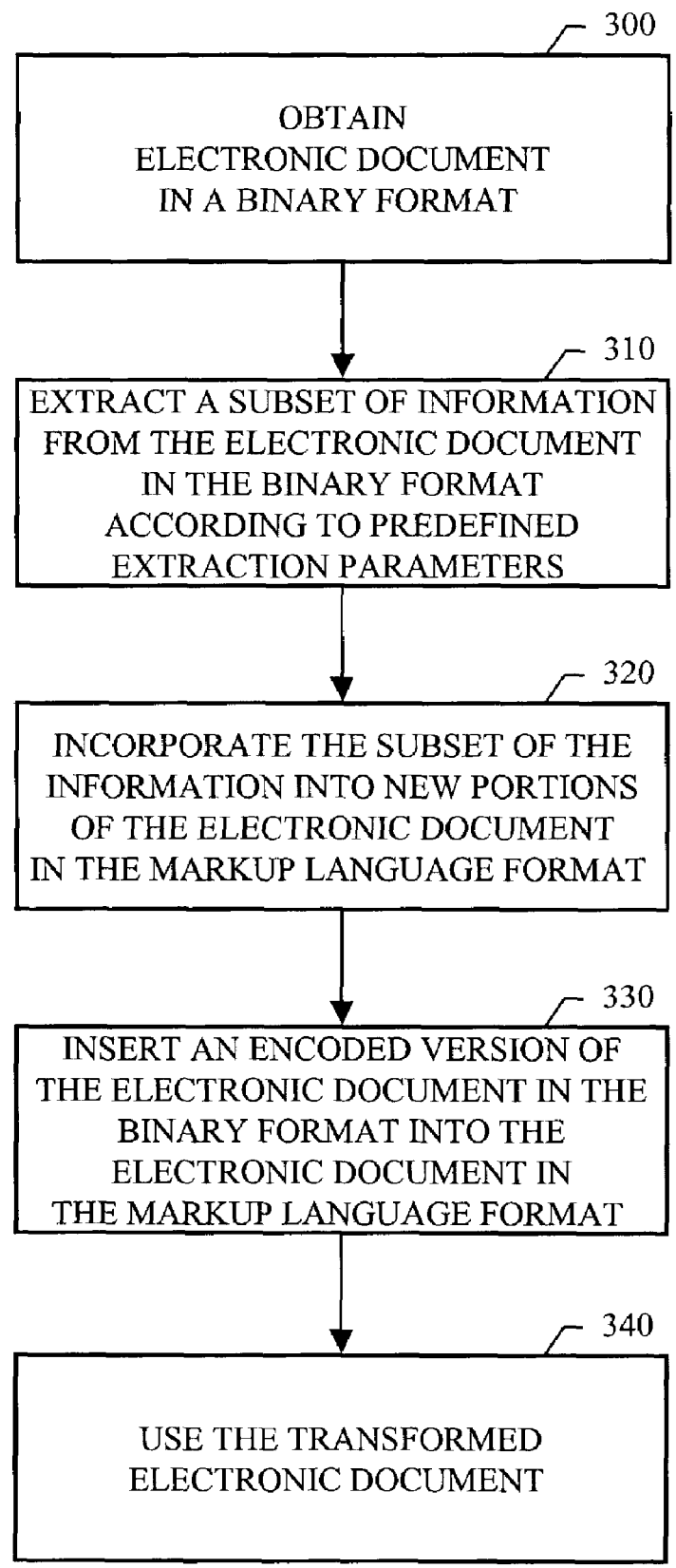
FIG. 3 is a flow chart illustrating reversible document format transformation from a binary format to a markup language format.

FIG. 3 is a flow chart illustrating reversible document format transformation from a binary format to a markup language format. An electronic document in a binary format is obtained at 300. This can involve loading the document from a file, receiving the document over a network, receiving the document from another application or software component, or generating the document in the binary format. A reversible format document is then formed, such as by transforming the electronic document in the binary format into a markup language format. This can involve extracting a subset of information from the electronic document in the binary format according to predefined extraction parameters at 310, incorporating the subset of the information into new portions of the electronic document in the markup language format at 320, and inserting an encoded version of the electronic document in the binary format into the electronic document in the markup language format at 330. After this transformation, the transformed electronic document can be used at 340.

The predefined extraction parameters can be extraction parameters defined by a user of the transformation tool, extraction parameters defined by a creator of the electronic document (e.g., extraction parameter metadata included in the document), and/or extraction parameters defined by the software tool used to effect the transformation. For example, the extraction parameters can be received as input to the transformation tool. Additionally, the electronic document can include rules governing information capture. For example, the electronic document can be a PDF form with an embedded XML template that specifies what data gets exposed in the XML format during transformation from PDF to XML. The data that gets exposed in the XML during transformation can be fully specified by the form designer, including context-specific data exposure and possible read/write permissions. In general, a form designer views a form as a vehicle for capturing, rendering and manipulating data, and the designer is thus concerned with issues of layout, interaction and processing. A form template specifies rules that govern the capture, rendering and manipulation of information for form instances created from that template. Thus, for example, a form template inside the electronic document can include rules that prevent XML data from overwriting specific field values when the document is transformed from XML to PDF.

The information that gets exposed in the XML form by the transformation can be key chunks of XML data identified within the PDF. For example, this information can include an XFA Template (XFT), XFA Data (XFD), XML Configuration Information (XCI), XFA Data Source Information, and/or Extensible Metadata Platform (XMP) information. The exposed information can also be information that is read from the PDF internal data and represented as XML. For example, this information can include structured text information, annotations, workflow routing information, asset management information and/or audit trail information. Exposing these types of information in a markup language format document as described can facilitate transaction handling and significantly improve electronic-document-based transaction processing systems. The markup language format can support multiple asset management schemas to provide seamless integration from one asset management system to another. Other third party workflow systems can have their own markup schema to route documents. The markup language format can support this routing schema as well as incorporate other workflow systems' schemas to facilitate integrate between different workflow systems.

The encoded version of the electronic document in the binary format can be a base-64 encoded version of the PDF. Other encodings suitable for encoding binary data into XML are also possible. Using the transformed electronic document can involve preprocessing the electronic document by modifying the markup language portion of the electronic document and/or sending the electronic document over a network. Preprocessing the electronic document can involve pre-populating the electronic document and/or server-side personalization of the electronic document.

Using the electronic document can also involve digitally signing the electronic document to produce a digital signature that facilitates transaction management. The electronic document that is digitally signed can include a PDF that has been flattened for archival, and the electronic document can be digitally signed to provide a secure transaction record. The digitally signed electronic document can be sent over a network in the markup language format. Alternatively, the digitally signed electronic document can be transformed to the binary format, sent over a network in the binary format, and transformed at the receiving end back into the markup language format to check the digital signature. The digital signature remains intact during the transformations of the document. This can be accomplished by not signing the encoded version of the electronic document in the binary format inside the transformed electronic document in the markup language format.

Alternatively, the digital signature process can be provided with an addressing scheme that allows designation of portions of the encoded version of the electronic document inside the markup language document to be included in a manifest specifying document portions to be signed. For example, a digital signature algorithm can be provided with knowledge of the binary format and the encoding, or the markup language portions of the document can include digital signature redirect links into the encoded version, the redirect links specifying the location and size of commonly signed document sections in the binary format.

Figure 4:
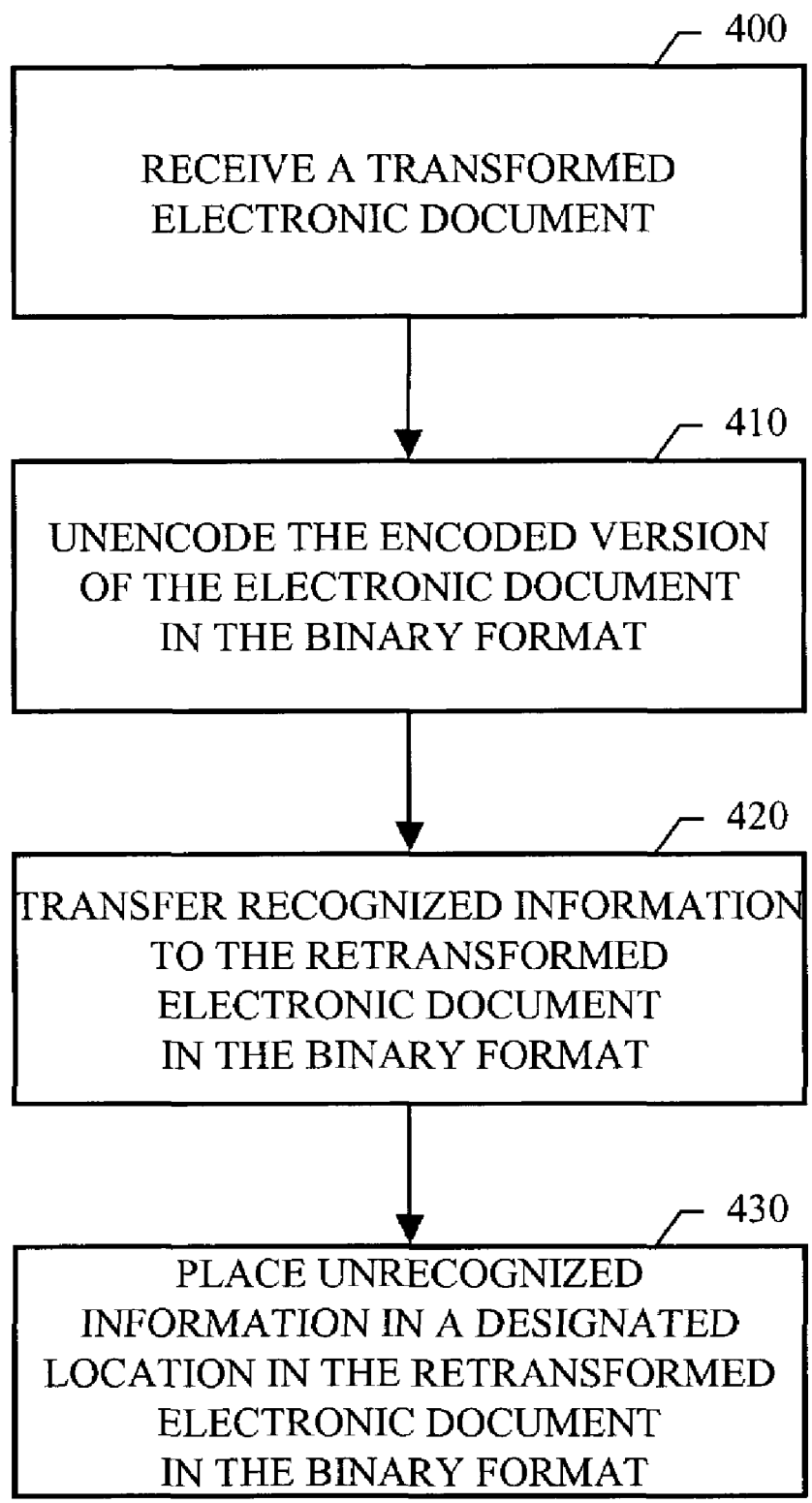
FIG. 4 is a flow chart illustrating reversible document format transformation from a markup language format to a binary format.

FIG. 4 is a flow chart illustrating reversible document format transformation from a markup language format to a binary format. A transformed electronic document in a markup language format is received at 400. This can involve loading the document from a file, receiving the document over a network, or receiving the document from another application or software component. The received document is then transformed into the binary format. This can involve unencoding the encoded version of the electronic document in the binary format at 410, and selectively updating the unencoded version of the electronic document in the binary format with information from a markup language portion of the received electronic document.

Recognized information can be transferred from the markup language portion of the received electronic document to the retransformed electronic document in the binary format at 420. The recognized information is the information that has a corresponding definition in the binary format, including possibly in a markup language format within the binary format or possibly in a format that is readily convertible to a markup language format. Unrecognized information can be packaged and stored in a designated location in the retransformed electronic document in the binary format, making the unrecognized information retrievable upon retransformation to the markup language format.

The unrecognized information can also be stored in a manner that facilitates access in the binary format as mentioned previously. The unrecognized information is the information that does not have a corresponding definition in the binary format. For example, new XML gets incorporated back into the PDF to be available after a later transformation, even if the transformation tool does not understand the new XML; XML data can either be embedded directly into the PDF or applied to the PDF data structures and not preserved as XML. Thus, the reversible format can be extensible.

Selectively updating the unencoded version of the electronic document in the binary format can involve a check for information conflicts. Transferring the recognized information can involve overwriting existing information in the unencoded version of the electronic document in the binary format in the event of information conflict. Transferring the recognized information can also involve selectively overwriting existing information in the unencoded version of the electronic document in the binary format based on read/write permissions. For example, some parts of the XML data in the XML exposed format may be read only such that changes to those parts are not retained (e.g., structured text may be exposed in the XML for information purposes only, where modification has no effect on the PDF after another transformation), and other parts of the XML data may be read/write (e.g., modifications to form data in the XML may be applied to the forms data structures in the PDF).

Figure 5:
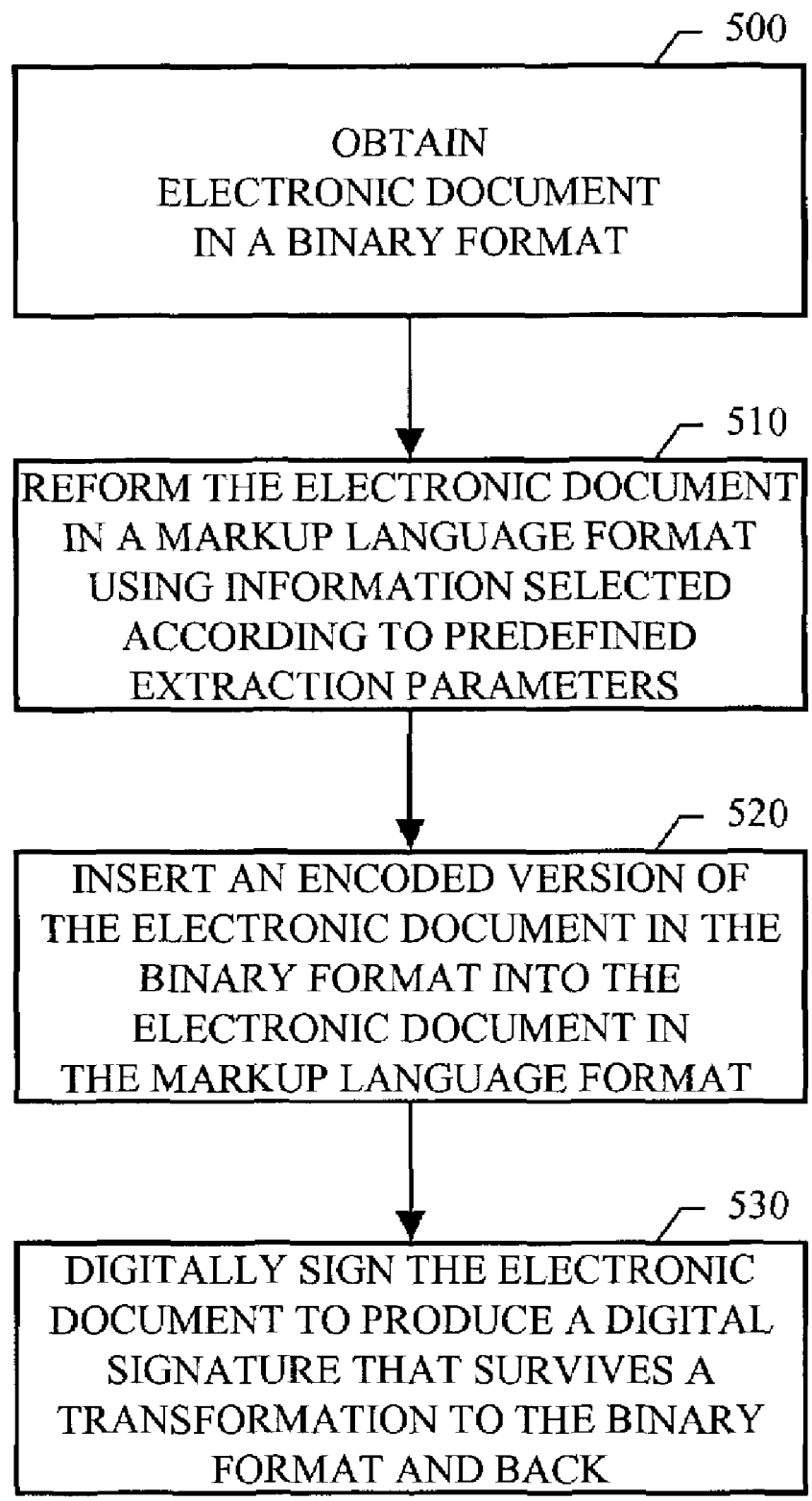
FIG. 5 is a flow chart illustrating reversible document format generation.

FIG. 5 is a flow chart illustrating reversible document format generation. An electronic document in a binary format is obtained at 500. This can involve generating the document in the binary format from input data, such as input XML data. The electronic document is reformed in a markup language format using information selected from the electronic document in the binary format according to predefined extraction parameters at 510. The selected information can be extracted from the document in the binary format or taken directly from the input data, and the predefined extraction parameters can be as described above. An encoded version of the electronic document in the binary format is inserted into the electronic document in the markup language format at 520. Then, the electronic document in the markup language format can be digitally signed to produce a digital signature at 530. The produced digital signature can be as described above and can survive a transformation of the electronic document to the binary format and back to the markup language format.

The invention can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the operations of the invention can be performed in a different order and still achieve desirable results.

What is claimed is:

1. A method for reversing a format of a reversible electronic document comprising two formatting states, the method comprising:

in a first document conversion for reversing an electronic document in a binary format into a markup language format, transforming the electronic document from the binary format into the markup language format by extracting a subset of information from the electronic document in the binary format according to predefined extraction parameters, inserting the subset of the information into portions of the electronic document in the markup language format, and inserting a reduced-information version of the electronic document in the binary format into a storage location of the electronic document in the markup language format such that the version of the electronic document in the binary format is retrievable upon reversal of the electronic document in the markup language format in a second document conversion, wherein the reduced-information version comprises data that is unconvertible to the markup language format; and in the second document conversion for reversing an electronic document in the markup language format into the binary format, transforming the electronic document from the markup language format into the binary format by extracting a first subset of information, from the electronic document in the markup language format, that is recognized in the binary format, extracting a second subset of information, from the electronic document in the markup language format, that is not recognized in the binary format, inserting the first subset of information, from the electronic document in the markup language format, into portions of the electronic document in the binary format, and placing the second subset of information from the electronic document in the markup language format into a storage location of the electronic document in the binary format such that the unrecognized information is retrievable upon reversal of the electronic document in the binary format in the first document conversion, wherein the second subset of information comprises data that is unconvertible to the binary format.

2. The method of claim 1, wherein transforming the electronic document from the binary format into the markup language format further comprises:

accessing the second subset of information in the storage location of the electronic document in the binary format; and inserting the data that is unconvertible to the binary format into the electronic document in the markup language format.

3. The method of claim 1, wherein transforming the electronic document from the markup language format into the binary format further comprises:

accessing the reduced-information version of the electronic document in the binary format in the storage location of the electronic document in the markup language format; and inserting the data that is unconvertible to the markup language format into the electronic document in the binary format.

4. The method of claim 1, wherein transforming the electronic document from the markup language format into the binary format further comprises:

checking for a case of an information conflict; and overwriting existing information in the electronic document in the binary format in the case of the information conflict.

5. The method of claim 1, wherein transforming the electronic document from the markup language format into the binary format further comprises selectively overwriting existing information in the electronic document in the binary format based on read/write permissions.

6. The method of claim 1, wherein the predefined extraction parameters comprise extraction parameters defined by a creator of the electronic document.

7. The method of claim 1, wherein the electronic document comprises rules governing information capture, and at least one of the subsets of information comprises at least a portion of the rules governing information capture.

8. The method of claim 7, wherein at least one of the subsets of information comprises a template definition including the at least a portion of the rules governing information capture.

9. The method of claim 1, the method further comprising sending the reversible electronic document over a network.

10. The method of claim 9, further comprising receiving, at a third party, the reversible electronic document over the network from a server, and preprocessing the reversible electronic document, wherein the preprocessing comprises prepopulating the reversible electronic document with data at the third party.

11. The method of claim 10, wherein preprocessing the reversible electronic document comprises server-side personalization of the reversible electronic document.

12. The method of claim 10, wherein sending the reversible electronic document over the network comprises electronically publishing the reversible electronic document.

13. The method of claim 1, further comprising:

using the reversible electronic document in one of the two formatting states, wherein using the reversible electronic document comprises digitally signing the reversible electronic document to produce a digital signature, wherein the digital signature remains intact when reversing the electronic document between the two formatting states.

14. The method of claim 1, wherein the binary format of the electronic document comprises a predetermined final format that defines an appearance of the electronic document.

15. The method of claim 14, wherein the predetermined final format comprises PDF.

16. The method of claim 14, wherein the markup language format comprises XML.

17. The method of claim 1, wherein transforming the electronic document into the markup language format further includes flattening the electronic document in the binary format.

18. The method of claim 1, wherein inserting the subset of the information into the portions of the electronic document in the markup language format comprises adding annotations.

19. The method of claim 1, wherein inserting the subset of the information into the portions of the electronic document in the markup language format comprises adding audit trail information.

20. The method of claim 1, wherein inserting the subset of the information into the portions of the electronic document in the markup language format comprises adding workflow routing information.

21. The method of claim 1, wherein inserting the subset of the information into the portions of the electronic document in the markup language format comprises adding asset management information.

22. The method of claim 1, wherein inserting the subset of the information into the portions of the electronic document in the markup language format comprises adding configuration information and data source information.

23. A software product tangibly stored on a machine-readable medium, the software product comprising instructions that cause a programmable processor to perform operations for reversing a format of a reversible electronic document comprising two formatting states, the operations comprising:
  in a first document conversion for reversing an electronic document in a binary format into a markup language format,
    transforming the electronic document from the binary format into the markup language format by
      extracting a subset of information from the electronic document in the binary format according to pre-defined extraction parameters,
      inserting the subset of the information into portions of the electronic document in the markup language format, and
      inserting a reduced-information version of the electronic document in the binary format into a storage location of the electronic document in the markup language format such that the version of the electronic document in the binary format is retrievable upon reversal of the electronic document in the markup language format in a second document conversion, wherein the reduced-information version comprises data that is unconvertible to the markup language format; and
  in the second document conversion for reversing an electronic document in the markup language format into the binary format,
    transforming the electronic document from the markup language format into the binary format by
      extracting a first subset of information, from the electronic document in the markup language format, that is recognized in the binary format,
      extracting a second subset of information, from the electronic document in the markup language format, that is not recognized in the binary format,
      inserting the first subset of information, from the electronic document in the markup language format, into portions of the electronic document in the binary format, and
      placing the second subset of information from the electronic document in the markup language format into a storage location of the electronic document in the binary format such that the unrecognized information is retrievable upon reversal of the electronic document in the binary format in the first document conversion, wherein the second subset of information comprises data that is unconvertible to the binary format.

24. The software product of claim 23, wherein operations for transforming the electronic document from the markup language format into the binary format further comprise:
  accessing the reduced-information version of the electronic document in the binary format in the storage location of the electronic document in the markup language format; and
  inserting the data that is unconvertible to the markup language format into the electronic document in the binary format.

25. The software product of claim 23, wherein operations for transforming the electronic document from the markup language format into the binary format further comprise:
  checking for a case of an information conflict; and
  overwriting existing information in the electronic document in the binary format in the case of the information conflict.

26. The software product of claim 23, wherein operations for transforming the electronic document from the markup language format into the binary format further comprise selectively overwriting existing information in the electronic document in the binary format based on read/write permissions.

27. The software product of claim 23, wherein the predefined extraction parameters comprise extraction parameters defined by a creator of the electronic document.

28. The software product of claim 23, wherein the electronic document comprises rules governing information capture, and the at least one of the subsets of information comprises at least a portion of the rules governing information capture.

29. The software product of claim 28, wherein at least one of the subsets of information comprises a template definition including the at least a portion of the rules governing information capture.

30. The software product of claim 23, wherein the operations further comprise:
  sending the reversible electronic document over a network.

31. The software product of claim 30, further comprising the operations of receiving, at a third party, the reversible electronic document over the network from a server, and preprocessing the reversible electronic document, wherein the preprocessing comprises pre-populating the reversible electronic document with data at the third party.

32. The software product of claim 31, wherein preprocessing the reversible electronic document comprises server-side personalization of the reversible electronic document.

33. The software product of claim 31, wherein sending the reversible electronic document over the network comprises electronically publishing the reversible electronic document.

34. The software product of claim 23, wherein the operations further comprise digitally signing the reversible electronic document in the markup language format to produce a digital signature that survives the transformation of the reversible electronic document to the binary format and back to the markup language format.

35. The software product of claim 23, wherein the binary format of the electronic document comprises a predetermined final format that defines an appearance of the electronic document.

36. The software product of claim 35, wherein the operations further comprise:
  flattening the electronic document in the binary format.

37. The software product of claim 35, wherein the predetermined final format comprises PDF.

38. The software product of claim 35, wherein the markup language format comprises XML.

39. The software product of claim 23, wherein at least one of the subsets of information comprises annotations.

40. The software product of claim 23, wherein at least one of the subsets of information comprises audit trail information and workflow routing information.

41. The software product of claim 23, wherein at least one of the subsets of information comprises asset management information, configuration information and data source information.

42. A system comprising:
a processor;
a machine-readable medium coupled with the processor;
a network interface coupled with the processor; and
a server software product tangibly stored on the machine-readable medium, the server software product comprising instructions that cause a programmable processor to perform operations for reversing a format of a reversible electronic document comprising two formatting states, the operations comprising:
in a first document conversion for reversing an electronic document in a binary format into a markup language format,
transforming the electronic document from the binary format into the markup language format by
extracting a subset of information from the electronic document in the binary format according to predefined extraction parameters,
inserting the subset of the information into portions of the electronic document in the markup language format, and
inserting a reduced-information version of the electronic document in the binary format into a storage location of the electronic document in the markup language format such that the version of the electronic document in the binary format is retrievable upon reversal of the electronic document in the markup language format in a second document conversion, wherein the reduced-information version comprises data that is unconvertible to the markup language format; and
in the second document conversion for reversing an electronic document in the markup language format into the binary format,
transforming the electronic document from the markup language format into the binary format by
extracting a first subset of information, from the electronic document in the markup language format, that is recognized in the binary format,
extracting a second subset of information, from the electronic document in the markup language format, that is not recognized in the binary format,
inserting the first subset of information, from the electronic document in the markup language format, into portions of the electronic document in the binary format, and
placing the second subset of information from the electronic document in the markup language format into a storage location of the electronic document in the binary format such that the unrecognized information is retrievable upon reversal of the electronic document in the binary format in the first document conversion, wherein the second subset of information comprises data that is unconvertible to the binary format.

43. The system of claim 42, wherein operations for transforming the electronic document from the binary format into the markup language format further comprises:
accessing the second subset of information in the storage location of the electronic document in the binary format; and
inserting the data that is unconvertible to the binary format into the electronic document in the markup language format.

44. The system of claim 42, wherein the electronic document comprises rules governing information capture, and at least one of the subsets of information comprises at least a portion of the rules governing information capture.

45. The system of claim 44, wherein at least one of the subsets of information comprises a template definition including the at least a portion of the rules governing information capture.

46. The system of claim 42, wherein the operations further comprise:
sending the reversible electronic document over a network, and
wherein operations for transforming the electronic document from the markup language format into the binary format further comprise:
accessing the reduced-information version of the electronic document in the binary format in the storage location of the electronic document in the markup language format; and
inserting the data that is unconvertible to the markup language format into the electronic document in the binary format.

47. The system of claim 42, wherein the operations further comprise digitally signing the reversible electronic document in the markup language format to produce a digital signature that survives the transformation of the reversible electronic document to the binary format and back to the markup language format.

48. The system of claim 42, wherein the binary format of the electronic document comprises a predetermined final format that defines an appearance of the electronic document.

49. The system of claim 48, wherein the predetermined final format comprises PDF.

50. The system of claim 48, wherein the markup language format comprises XML.

51. The system of claim 42, wherein the operations further comprise
flattening the electronic document in the binary format.

52. The system of claim 42, wherein operations for transforming the electronic document from the markup language format into the binary format further comprise:
checking for a case of an information conflict; and
overwriting existing information in the electronic document in the binary format in the case of the information conflict.

53. The system of claim 42, wherein operations for transforming the electronic document from the markup language format into the binary format further comprise selectively overwriting existing information in the electronic document in the binary format based on read/write permissions.

54. The system of claim 42, wherein the predefined extraction parameters comprise extraction parameters defined by a creator of the electronic document.

55. The system of claim 42, the operations further comprising sending the reversible electronic document over a network.

56. The system of claim 55, the operations further comprising receiving, at a third party, the reversible electronic document over the network from a server, and preprocessing the reversible electronic document, wherein the preprocessing comprises pre-populating the reversible electronic document with data at the third party.

57. The system of claim 56, wherein preprocessing the reversible electronic document comprises server-side personalization of the reversible electronic document.

58. The system of claim 56, wherein sending the reversible electronic document over the network comprises operations for electronically publishing the reversible electronic document.

59. The system of claim 42, wherein inserting the subset of the information into the portions of the electronic document in the markup language format comprises operations for adding annotations.

60. The system of claim 42, wherein inserting the subset of the information into the portions of the electronic document in the markup language format comprises operations for adding audit trail information.

61. The system of claim 42, wherein inserting the subset of the information into the portions of the electronic document in the markup language format comprises operations for adding workflow routing information.

62. The system of claim 42, wherein inserting the subset of the information into the portions of the electronic document in the markup language format comprises operations for adding asset management information.

63. The system of claim 42, wherein inserting the subset of the information into the portions of the electronic document in the markup language format comprises operations for adding configuration information and data source information.

* * * * *